United States Patent [19]

Otto et al.

[11] 3,828,277

[45] Aug. 6, 1974

[54] INTEGRAL CAPACITOR LATERAL DISCHARGE LASER

[75] Inventors: William F. Otto; Richard D. Milton, both of Huntsville, Ala.

[73] Assignee: The United States of America as represented by the Secretary of the Army, Washington, D.C.

[22] Filed: July 3, 1973

[21] Appl. No.: 376,261

Related U.S. Application Data

[63] Continuation-in-part of Ser. No. 212,526, Dec. 27, 1971, abandoned.

[52] U.S. Cl. ............................ 331/94.5 PE, 330/4.3
[51] Int. Cl. .............................................. H01s 3/09
[58] Field of Search...................... 331/94.5; 330/4.3

[56] References Cited
UNITED STATES PATENTS
| | | | |
|---|---|---|---|
| 3,743,881 | 7/1973 | Blaszuk | 313/217 |
| 3,745,481 | 7/1973 | Erickson et al. | 331/94.5 |
| 3,748,594 | 7/1973 | Pugh | 331/94.5 |

OTHER PUBLICATIONS

Crocker et al., Electronics Letters, Vol. 5, No. 4, Feb. 20, 1969, pp. 63–64. TK 6540 16

Primary Examiner—Ronald L. Wibert
Assistant Examiner—R. J. Webster
Attorney, Agent, or Firm—Edward J. Kelly; Herbert Berl; Aubrey J. Dunn

[57] ABSTRACT

A high pressure gas laser is described in which uniform electrical field distribution is obtained for lateral discharge in the gas by employing a capacitor formed within the laser cavity. The laser may be a parallelepiped with capacitor plates forming two opposite rides of the parallelepiped. One of the plates is coated with a ceramic dielectric. Alternatively, the laser may be a conductive circular cylinder with a center electrode, and with a ceramic dielectric coating on the inside of the cylinder. A high voltage source is connected to the laser. Emission occurs when the capacitor charges to a high enough voltage to discharge through the gas. For better charge distribution, the coating may be covered by a resistive layer, or may have a mosaic of isolated conductors thereon.

3 Claims, 4 Drawing Figures

PATENTED AUG 6 1974 3,828,277

INTEGRAL CAPACITOR LATERAL DISCHARGE LASER

REFERENCE TO RELATED PATENT APPLICATION

This application is a Continuation-In-Part of Ser. No. 212,526, filed Dec. 27, 1971, now abandoned.

BACKGROUND OF THE INVENTION

Typical gas lasers operate with gas pressures of a small fraction of an atmosphere. These lasers may operate continuously, but have relatively low outputs as compared to pulsed solid-state lasers. Pulsed gas lasers with gas pressure as high as atmospheric pressure can provide higher peak output powers than low-pressure gas lasers, but it is difficult to achieve a properly distributed electrical discharge in such lasers, with the very high voltages necessary. The instant invention overcomes this difficulty.

SUMMARY OF THE INVENTION

The invention includes a high pressure (up to atmospheric) gas laser pumped by a lateral discharge from an integral capacitor. The capacitor has two surfaces exposed to the gas in the laser, with one surface coated by a ceramic dielectric. When the capacitor is charged to a sufficiently high voltage, it discharges through the dielectric and the gas.

DETAILED DESCRIPTION OF THE INVENTION

Figure 1:
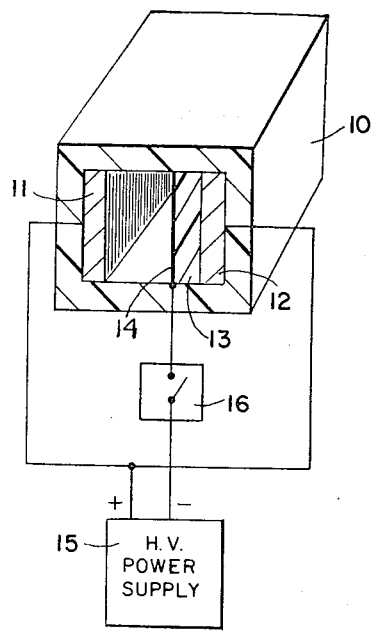
FIG. 1 shows a sectional perspective view of one embodiment of the invention.
Figure 2:
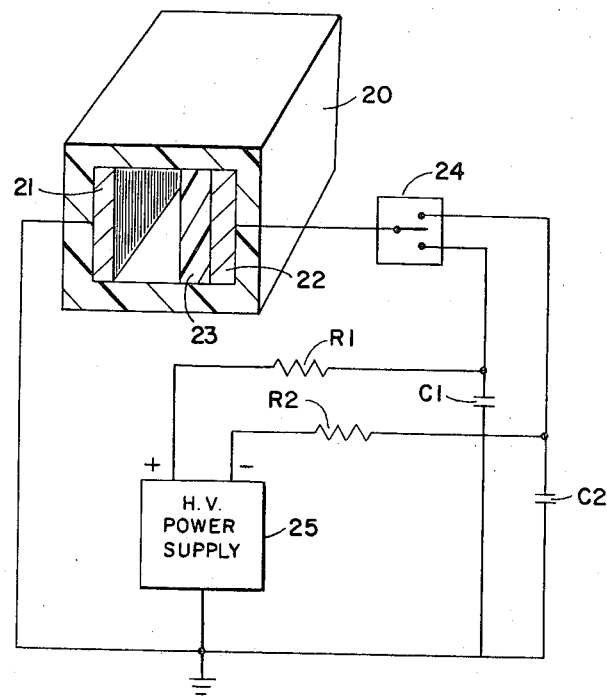
FIG. 2 shows another embodiment of the invention.

The instant invention laser uses a ceramic capacitor as a portion of the laser wall to achieve a distributed electrical discharge in the laser tube. The normal tendency of a lateral discharge between two parallel electrodes is for the discharge to occur at one point as opposed to the uniform distribution desired. This tendency is increased as the gas pressure is raised. To overcome this effect, a long ceramic capacitor is used as one of the discharge electrodes. Connection is made to a conducting plate on one side of the dielectric and the gas discharge takes place to the other side of the dielectric which has no conducting plate. The absence of the conducting plate prevents the entire charge of the capacitor from being discharged from one point. Each local region of charge in the dielectric must discharge independently into the gas. Ceramic is chosen as the dielectric because of its high dielectric constant. The amount of charge per unit area is proportional to the dielectric constant. The presence of only one capacitor plate means that the capacitor cannot be charged in the normal manner. One possible solution is to provide a plate resistor on the side facing the gas discharge. This plate would conduct sufficiently to allow slow charge rates but would not allow any appreciable current to flow along the surface during the short discharge period. FIG. 1 shows this embodiment. This complexity may be avoided by charging the capacitor through the gas in the same manner that discharge takes place. The circuit is shown in FIG. 2. Each time the switch is actuated, a pulse of current flows through the laser causing laser output. The current pulses alternate in direction but this has no effect on the laser output.

A bare dielectric distributes the discharge reasonably well if the discharge gap is not excessively wide. A wide gap causes a surface spark to form on the dielectric. The spark forms a conducting sheath. This of course defeats the purpose for which the conducting plate was omitted in that it permits the entire charge of the capacitor to be discharged in a small region. It has been found that a pattern of isolated conducting plates on the discharge surface helps to avoid this effect. This is illustrated in FIG. 4.

Figure 4:
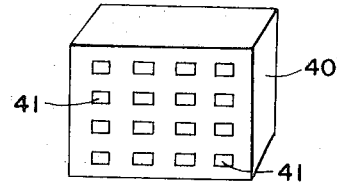
FIG. 4 shows an alternate embodiment of one portion of FIGS. 1 and 2.

The integral capacitor concept can also be implemented in a coaxial laser configuration as shown in FIG. 4. This form would have advantages of simplicity of construction, larger energy storage and would minimize voltage breakdown problems at the edges of the ceramic capacitor.

Referring now to the embodiment shown in FIG. 1, a gaseous laser having housing 10 is shown, with the near end open to show its construction. Although not shown, it should be understood that the housing would include the usual end reflectors to define the laser optical cavity. The housing is constructed of an insulating material. Within housing 10 are capacitor plates 11 and 12, dielectric layer 13, and resistor coating 14. The housing is filled with a laser gas. Plates 11 and 12 are connected to one terminal of high-voltage power supply 15. Coating 14 is connected through switch 16 to the other terminal of 15. When switch 16 is closed, the capacitor charges until sufficient voltage is present to discharge through the gas. It should be understood that the laser normally includes partial and full reflective mirrors at opposite ends of the housing, and that the housing is gas-tight. A typical dielectric which may be used for layer 13 is barium titanate, which has a dielectric constant in excess of 3000. This dielectric is readily able to withstand discharges in the invention. Silver may be used for plates 11 and 12. The laser gas in the housing may be a $CO_2$, $N_2$, He combination.

FIG. 2 shows another embodiment with housing 20 similar to housing 10 of FIG. 1. Within 20 are capacitor plates 21 and 22 and ceramic dielectric 23. The open space between the plates is filled with gas. As can be seen, plate 22 is connectable through switch 24 to one side of capacitors C1 and C2. These capacitors are charged to opposite potentials by high-voltage power supply 25 through resistors R1 and R2. The other sides of C1 and C2, and plate 21 are connected to the ground terminal of supply 25. The capacitor in the laser is charged and discharged through the gas by alternately operating switch 24 between capacitors C1 and C2. Each time such charge or discharge occurs, the laser emits. Obviously, the laser includes end mirrors as described above for FIG. 1.

Figure 3:
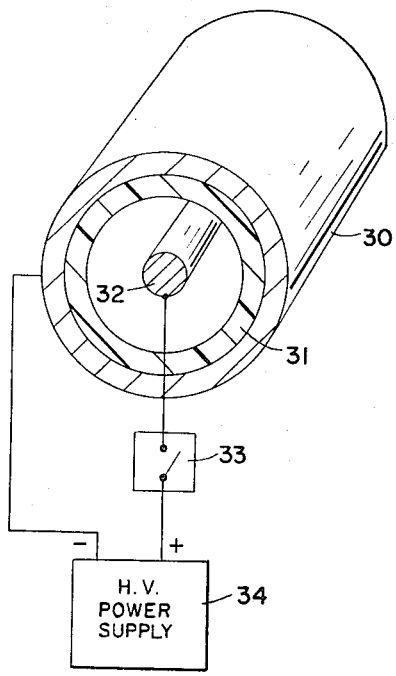
FIG. 3 shows yet another embodiment of the invention.

Yet another embodiment of the invention is shown in FIG. 3 wherein metal housing 30 is shown, with tubular ceramic dielectric 31 therein. A center metal electrode 32 is coaxial with and supported in 30 and 31 (by means not shown). Gas fills the remainder of 30. Housing 30 is connected through switch 33 to one pole of high-voltage power supply 34. Electrode 32 is connected to the other pole of 34. Lasing occurs when the 30–32 capacitor discharges through the gas after being charged from 34 by the closure of switch 33.

FIG. 4 shows an alternate dielectric for element 23 in FIG. 2. This alternate includes ceramic dielectric 40 with a mosaic of isolated conductive chips on one side. If used in place of 22, this one side would face plate 21. The FIG. 4 dielectric allows a more uniform discharge than can be obtained with dielectric 23. If the alternate dielectric were used in FIG. 1, it would be necessary to disconnect the connections to 14 and 12, and connect 12 to the side of switch 16 now shown connected to 14. The chips may be silver.

The integral capacitor laser achieves a distributed discharge with gas pressures much higher than normally possible and with lower operating voltage. If the laser is operated at atmospheric pressure no vacuum pumps or windows are required. Also the integral capacitor configuration is favorable to obtaining very short electrical pulses and the high gas pressure potentially offers equally fast laser pulses.

Particular examples of the various parameters of the invention may be readily obtained by one skilled in the art by the following technique:

1. Decide the required output laser energy, for example, 100 joules.
2. Assume a reasonable efficiency of the laser, for example, 0.1 for $CO_2$ lasers.
3. Pick a laser length based on the resonator, output optics, and other such parameters.
4. Pick a diameter (for round laser, and width and height for rectangular laser) such that the required input energy may be stored for the particular voltage, dielectric constant and dielectric thickness based on dielectric strength in accordance with the formula $\frac{1}{2} CE^2$ = energy = 1000 joules for the particular example above. In the equation, C is capacitance and E is voltage.
5. Determine the gas pressure, gas ratios, and the diameter of the center electrode to optimize the system.

It is assumed in the above technique that E (the input voltage to the laser) is fixed and a typical example of the voltage is 40 KV. Although ones does not need to know the discharge current for the laser to properly operate, a typical current would be 2.5 K amps. Obviously, the invention would be a pulsed laser. The pumping pulse duration may typically be 10 microseconds. For the conditions assumed above, a dielectric thickness of approximately 1 inch would be used, for a 4 inch outside diameter barium titanate cylinder. An inner electrode (referring to FIG. 3) diameter of about one-half inch would give a discharge gap of approximately three-fourths inch.

We claim:

1. In an internal capacitor lateral discharge laser: a gas-tight housing; a gas in said housing capable of lasing; a first elongated electrode in said housing; a second elongated electrode in said housing parallel to said first electrode; and a dielectric coating covering said second electrode; a high voltage power supply having different polarity terminals; means for directly connecting respective terminals of said power supply to said electrodes; further including a resistance coating on said dielectric coating; whereby said first and second electrodes form a capacitor.

2. In an internal capacitor lateral discharge laser: a gas-tight housing; a gas in said housing capable of lasing; a first elongated electrode in said housing; a second elongated electrode in said housing parallel to said first electrode; and a dielectric coating covering said second electrode; a high voltage power supply having different polarity terminals; means for directly connecting respective terminals of said power supply to said electrodes; further including a mosaic of isolated conductive chips on said dielectric layer; whereby said first and second electrodes form a capacitor.

3. The laser as set forth in claim 1 further including switch means, and wherein said electrodes are connected to one terminal of said power supply, and said resistance coating is connectable to another terminal of said power supply by said switch means.

* * * * *